United States Patent
Keck et al.

[11] 3,806,223
[45] Apr. 23, 1974

[54] PLANAR OPTICAL WAVEGUIDE

[75] Inventors: Donald B. Keck, Big Flats; Peter C. Schultz, Painted Post, both of N.Y.

[73] Assignee: Corning Glass Works, Corning, N.Y.

[22] Filed: Mar. 30, 1972

[21] Appl. No.: 239,701

[52] U.S. Cl............ 350/96 WG, 65/DIG. 7, 117/45
[51] Int. Cl.................................................. G02b 5/14
[58] Field of Search ............................... 350/96 WG

[56] References Cited
UNITED STATES PATENTS

| | | | |
|---|---|---|---|
| 3,386,787 | 6/1968 | Kaplan | 350/96 WG |
| 3,542,536 | 11/1970 | Flam et al. | 350/96 WG X |
| 3,659,915 | 5/1972 | Maurer et al. | 350/96 WG |
| 3,659,916 | 5/1972 | Marcatili | 350/96 WG |

Primary Examiner—John K. Corbin
Attorney, Agent, or Firm—Walter S. Zebrowski

[57] ABSTRACT

A method of producing a planar optical waveguide by applying to at least a portion of one flat surface of a substantially flat glass substrate having a predetermined desired index of refraction a first coating of glass having an index of refraction greater than that of said glass substrate. Thereafter a second coating of glass having an index of refraction less than that of the first coating of glass is applied over the exposed surface of the first coating of glass. The thickness of the first coating of glass being determined as a function of the highest mode order and the wavelength of light to be propagated within a waveguide having infinite width, and the indices of refraction of the substrate and each of the applied coatings.

12 Claims, 5 Drawing Figures

PLANAR OPTICAL WAVEGUIDE

BACKGROUND OF THE INVENTION

Integrated optical circuits are the basis of a new emerging field. Light is guided through integrated optical circuits by means of planar optical waveguides which are constructed from amorphous or crystalline dielectric materials that are transparent to the energy being transmitted. Planar optical waveguides as herein referred to are films or layers of such materials having a thickness equal to about the wavelength of the light of energy transmitted and a predetermined desired width. Ordinarily waveguides are termed planar when the width thereof is substantially greater than the thickness, while waveguides having a smaller width to thickness ratio are termed rectangular waveguides. For the purposes of the present invention, however, the term planar waveguide will be used to denote all non-circular waveguides regardless of the width to thickness ratios thereof.

It is well known to one skilled in the art that light can be caused to propagate along a transparent member which has a higher refractive index than its surroundings. Planar optical waveguides are useful in integrated optical circuits for computers or for coupling, demodulation, or other purposes in optical communications systems. The advantages of integrated optical circuits over electrical circuits is speed of signal transmission, ruggedness, long life, and the like. Waveguides produced for these purposes must avoid excessive attenuation of the transmitted light to be effective. Further, to be an effective transmitting media within an integrated optical circuit, a planar waveguide should not only transmit light without excessive attenuation, but also should not cause excessive dispersion of the transmitted light and should allow only preselected modes of light to propagate along the waveguide. To the extent that planar waveguides have heretofore been fabricated, they have not been found to permit high transmission.

Some operational theories and other pertinent information concerning planar optical waveguides may be found in the publication "Evanescent Field Coupling into a Thin-Film Waveguide" by J. E. Midwinter, IEEE Journal of Quantum Electronics, Vol. QE-6, No. 10, October, 1970, pages 583-590; "Light Waves in Thin Films and Integrated Optics" by P. K. Tien, Applied Optics. Vol. 10, No. 11, November, 1971, pages 2395-2413; and "Dielectric Rectangular Waveguide and Directional Coupler for Integrated Optics" by E. A. J. Marcatili, The Bell System Technical Journal, Vol. 48, No. 7, September 1969, pages 2071-2102.

The propagation of light waves is governed by the same laws of physics that govern microwave propagation and, therefore, can also be studied in terms of modes. Since each mode of light traveling along a planar waveguide propagates at its own inherent velocity, it can be shown that information initially supplied to all modes will be dispersed after traveling a given length of waveguide due to different propagation velocities. Producing a satisfactory planar optical waveguide has been one of the more difficult problems in the development of effective integrated optical circuits.

SUMMARY OF THE INVENTION

It is an object of the present invention to provide a planar optical waveguide and a method of economically producing it which overcomes the heretofore noted disadvantages.

Other objects of the present invention are to provide a method for producing planar optical waveguides that will not cause excessive light absorption losses nor cause excessive dispersion of the transmitted light, and to provide a method that prevents the formation light scattering centers at the core and cladding interface.

Broadly, according to this invention a planar optical waveguide is produced by applying to at least a portion of one flat surface of a substantially flat glass substrate having a predetermined desired index of refraction a first coating of glass having an index of refraction greater than that of the glass substrate. Thereafter a second coating of glass having an index of refraction less than that of the first coating is applied over the exposed surface of the first coating of glass. The thickness of each of the substrate and the second coating of glass being at least about two times the thickness of the first coating of glass. The thickness of the first coating of glass for any desired finite width thereof is equal to or is less than the thickness "$a$" of a coating having an infinte width, thickness "$a$" being determined in accordance with one of the following equations:

for $TM_{Om}$ modes where $m$ is an even integer
$2a/\lambda(n_2^2 - n_1^2)^{1/2} = m + 1 + 1/\pi \tan^{-1}[(n_1^2 - n_3^2)/(n_2^2 - n_1^2)]^{1/2}(n_2/n_3)^2$, for $TM_{Om}$ modes where $m$ is an odd integer
$2a/\lambda (n_2^2 - n_1^2)^{1/2} = m + 1 - 1/\pi \cot^{-1}(n_1^2 - n_3^2/n_2^2 - n_1^2)^{1/2}(n_2/n_3)^2$, for $TE_{Om}$ modes where $m$ is an even integer
$2a/\lambda (n_2^2 - n_1^2)^{1/2} = m + 1 + 1/\pi \tan^{-1}(n_1^2 - n_3^2/n_2^2 - n_1^2)^{1/2}$, for $TE_{Om}$ modes where $m$ is an odd integer
$2a/\lambda (n_2^2 - n_1^2)^{1/2} = m + 1 - 1/\pi \cot^{-1}(n_1^2 - n_3^2/n_2^2 - n_1^2)^{1/2}$, where $m$ is equal to or less than 10 and is the highest mode order to be propagated within a waveguide the first coating of which has a thickness "$a$" and an infinite width, $\lambda$ is the waveguide of light to be propagated within the waveguide having a thickness "$a$" and an infinite width, $n_2$ is the index of refraction of the first coating and one of $n_1$ and $n_3$ being the index of refraction of the substrate while the other $n_1$ and $n_3$ being the index of refraction of the second coating of glass. The thickness of the first coating of glass being so determinable where the propagation constant of the waveguide is equal to or less than $K_1$, where $K_1$ is greater than $K_3$, and where $$K_1 = 2\pi n_1/\lambda, \text{ and}$$
$$K_3 = 2\pi n_3/\lambda$$

These and additional objects, features and advantages of the present invention will become apparent to those skilled in the art from the following detailed description and the attached drawing, on which, by way of example, only the preferred embodiment of this invention is illustrated.

DETAILED DESCRIPTION OF THE INVENTION

It is to be noted that the drawings are illustrative and symbolic of the invention and there is no intention to indicate scale or relative proportion of the elements shown therein.

Figure 1:
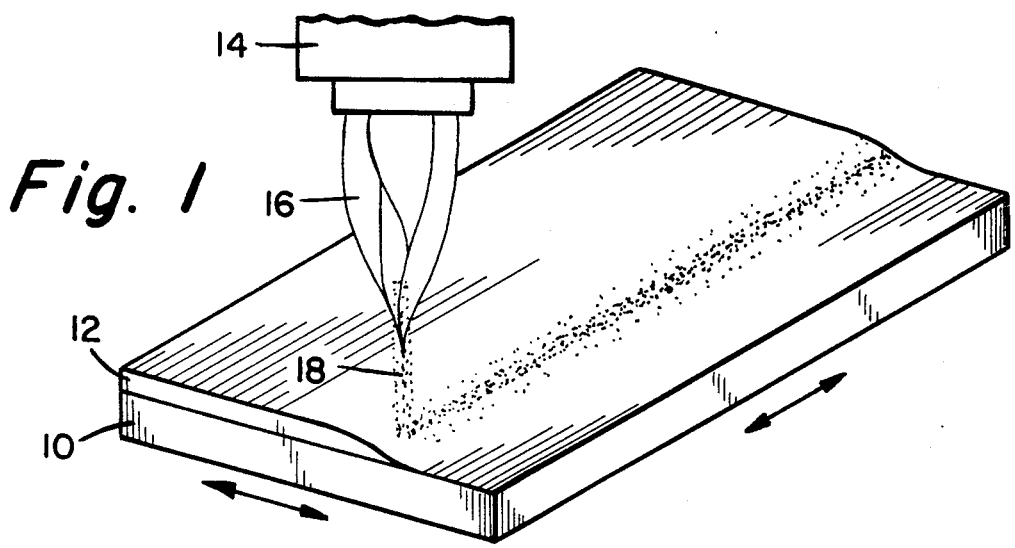
FIG. 1 is a fragmentary oblique illustration of the application of a first coating to a substrate in the formation of a planar optical waveguide.

Referring to FIG. 1, there is shown a substrate 10 to which a first coating 12 of glass is applied. First coating 12 is applied to at least a portion of one of the exposed glass surfaces of substrate 10 and has an index of refraction greater than that of substrate 10.

First coating 12 is illustrated as being applied to substrate 10 by means of a flame hydrolysis burner 14. Burner 14 emits a flame 16 in which a gas-vapor mixture is hydrolyzed to form a soot. The soot leaves flame 16 in a stream 18 and is directed toward one of the flat surfaces of substrate 10. The flame hydrolysis method of forming a coating is hereinafter described in detail.

Substrate 10 is suitably mounted in the path of stream 18 and caused to translate in both the forward and backward as well as the side to side directions to permit the application of first coating 12 over all or the desired portion of substrate 10. Suitable means for translating substrate 10 in both directions may be any means known in the art for accomplishing this purpose such for example as a milling machine bed or a dual motorized platform with a chuck mounting for the substrate. The limits of translated movements are controlled by microswitches linked to reversing motor drive systems.

It is to be understood that an elongated ribbon burner that provides a long stream of soot could be used in place of the substantially concentric burner illustrated in the drawing whereby the substrate would require translation in one direction only. Further, a plurality of burners 14 could be employed in a row to similarly require translation in one direction only. A plurality of burners suitably spaced over the entire area of the substrate, to which it is desired to apply a coating, would eliminate the need for any translation of the substrate. Similarly, if the area to be coated is sufficiently small, one burner 14 as illustrated in the drawing, could be used to apply the entire coating without translation of the substrate.

Figure 2:
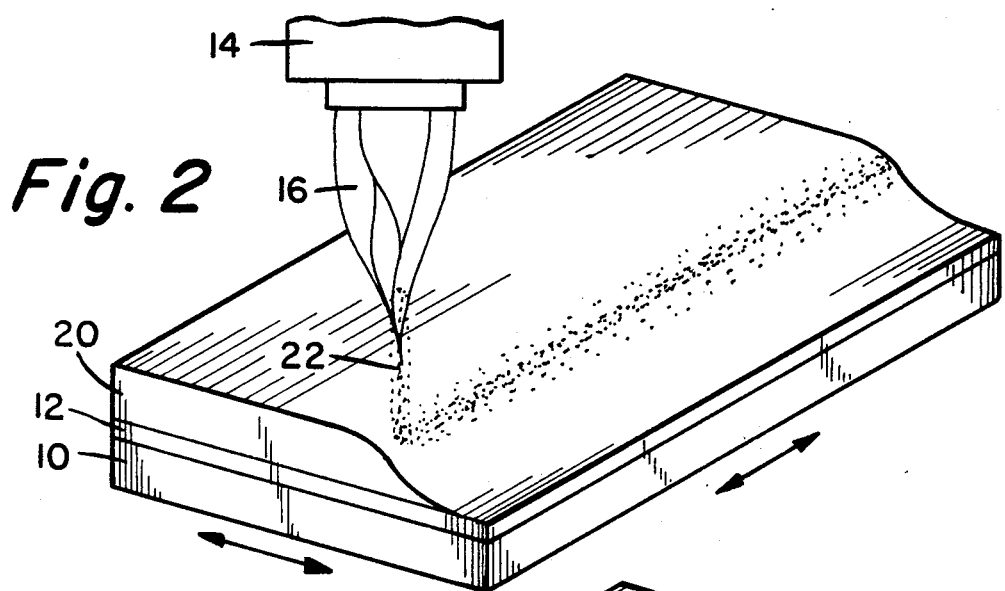
FIG. 2 is a fragmentary oblique illustration of the application of a second coating in the formation of a planar optical waveguide.

Referring additionally to FIG. 2, a second coating 20 of glass having a predetermined desired index of refraction is similarly applied over the exposed surface of first coating 12 by the same flame hydrolysis method heretofore noted. As illustrated in FIG. 2, the soot leaves flame 16 in a stream 22 and is directed to the exposed surface of first coating 12. Similarly, the substrate and first coating 12 is translated as heretofore described for uniform deposition of the second coating of soot. First coating 12 will form the core of the planar optical waveguide while substrate 10 and second coating 20 will form the cladding. As will be hereinafter described, the index of refraction of a waveguide cladding must be less than the index of refraction of the core for proper operation.

When coatings 12 and 20 are applied by means of a flame hydrolysis method, the deposited soot must be sintered either simultaneously with the deposition thereof or by a subsequent operation to provide a uniform and dense material. In accordance with the present invention, coating 12 may be sintered and its exterior surface suitably finished before coating 20 is applied. In such an embodiment, coating 20 would thereafter be sintered either during the deposition thereof or subsequent thereto.

Figure 3:
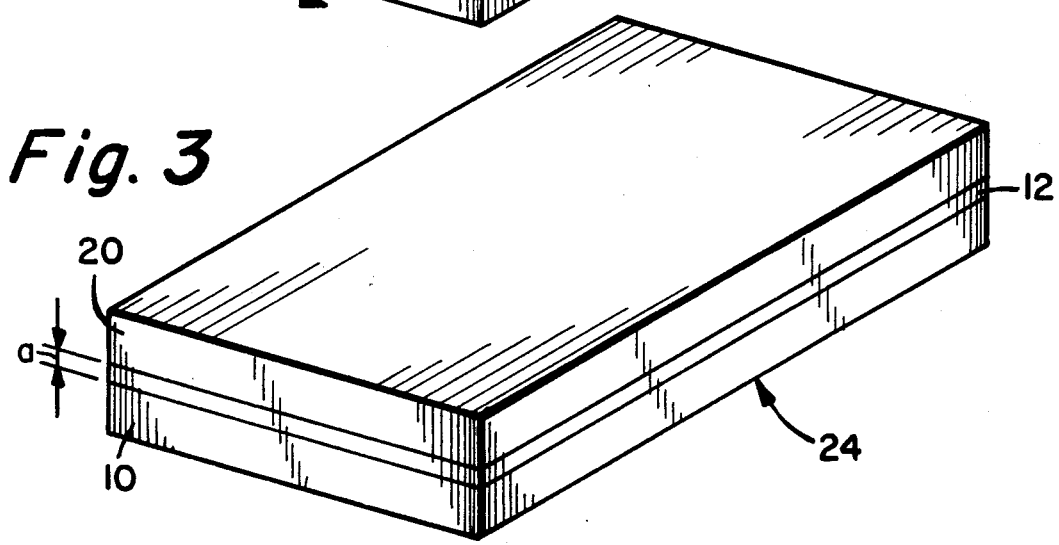
FIG. 3 is an oblique illustration of the planar optical waveguide of the present invention.

Referring to FIG. 3, there is illustrated planar optical waveguide 24 including substrate 10, first coating 12, and second coating 20. The thickness of first coating 12 or the core is indicated by "$a$."

Figure 4:
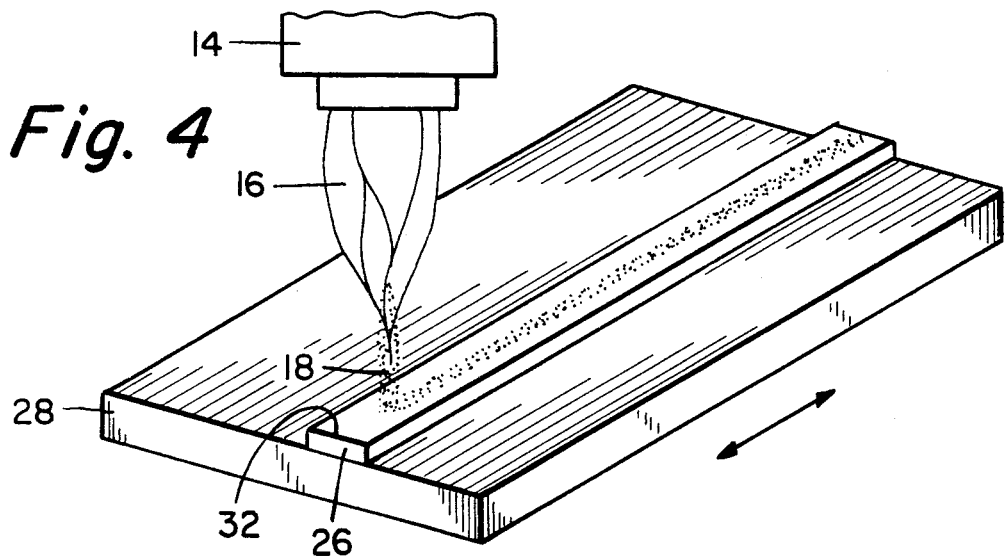
FIG. 4 is a fragmentary oblique illustration of another embodiment of the present invention wherein a first coating having a relatively narrow width is applied to a substrate in the formation of a planar optical waveguide.
Figure 5:
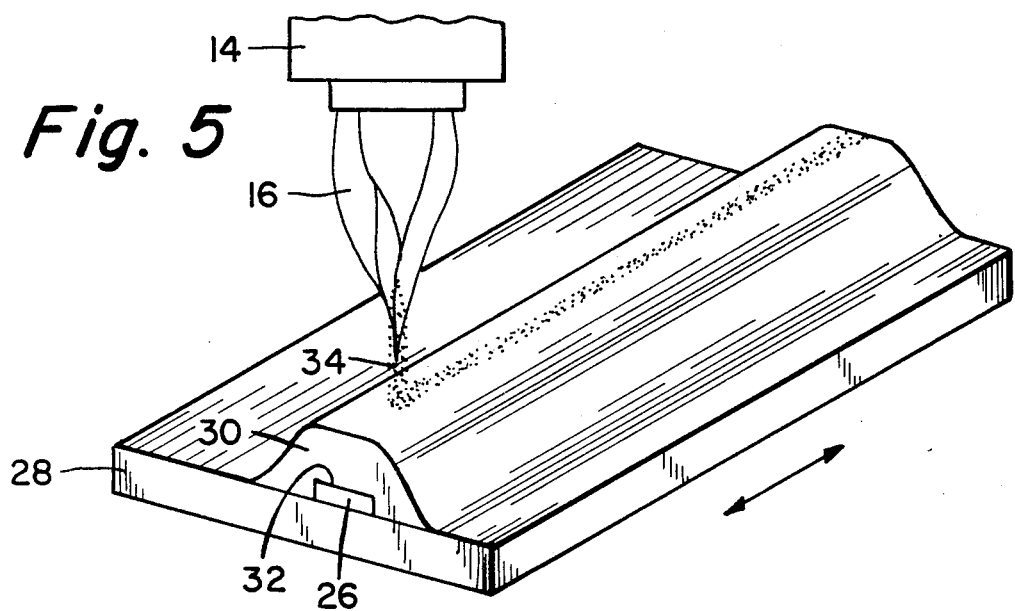
FIG. 5 is a fragmentary oblique illustration of the application of a second coating in the formation of the waveguide of FIG. 4.

Referring to FIGS. 4 and 5, there is illustrated the formation of a planar optical waveguide wherein the first coating or core 26 is applied to substrate 28 in a narrow path by means of flame hydrolysis burner 14. As described in connection with FIG. 1, burner 14 emits a flame 16 in which a gas-vapor mixture is hydrolyzed to form a soot which leaves flame 16 in a stream 18. First coating 26 is applied in a narrow path, such for example as one having a width to thickness ratio of less than 10. A planar waveguide with such a narrow core permits high integrated optical circuit density. After first coating 26 is applied to substrate 28, a second coating 30 is applied over at least the outer exposed surface 32 of first coating 26. Second coating 30 has an index of refraction less than that of first coating 26 and is formed by emitting soot from flame 16 as a stream 34 in the manner heretofore described in connection with FIG. 2. When the width of first coating 26 becomes small enough, it will be necessary to apply second coating 30 over both the outer exposed surface 32 as well as the exposed side edges of first coating 26, as illustrated in FIG. 5. Such coating over the side edges of a first coating having a low width to thickness ratio is required to minimize signal losses and to permit efficient waveguide operation.

The materials of the substrate and the first and second coatings of a planar optical waveguide should be produced from a glass having minimum light absorption characteristics, and although any optical quality glass may be used, a particularly suitable base glass from which to make a planar optical waveguide is fused silica. For structural and other practical considerations, it is desirable for the core and cladding glasses to have similar physical characteristics. Since the core glass must have a higher index of refraction than the cladding for proper operation, the core glass may desirably be formed of the same basic type of glass used for the cladding but doped with a small amount of some other material to slightly increase the index of refraction thereof. Therefore, if pure fused silica is used as the cladding glass, fused silica doped with a material to increase the index of refraction can be used as the core glass.

There are many suitable materials that can satisfactorily be used as a dopant alone or in combination with each other. These include, but are not limited to, titanium oxide, tantalum oxide, tin oxide, niobium oxide, zirconium oxide, aluminum oxide, lanthanum oxide, and germanium oxide. The amount of dopants used should be carefully controlled for various reasons. For example, since additional doping material would cause the index of refraction to increase, the difference between the index of refraction of the cladding glass and the core glass would also increase requiring a decrease in the allowable core thickness of the planar waveguide as hereinafter explained. Further, if an excessive amount of doping material is added to the base material, a loss in light transmission will result. Desirably, a precise amount of dopant should be added to the base material for the primary purpose of changing the index of refraction. For the purposes of the present invention, the amount of dopant is preferably maintained below about 40 percent by weight of the total composition depending on the dopant. For example, aluminum oxide may be added up to about 40 percent by weight, while titanium oxide should be maintained below about 20 percent by weight.

The first and second coatings may be applied by a variety of methods including but not limited to sintering a coating of soot deposited by the flame hydrolysis process, chemical vapor deposition, depositing a glass frit and thereafter sintering it, and the like. Clearly, the first and second coatings may be applied by either the same or different methods.

A particularly effective method of forming or applying a coating is accomplished by flame hydrolysis process similar to that described in U.S. Pat. No. 2,272,342 issued to J. F. Hyde or U.S. Pat. No. 2,326,059 issued to M. E. Nordberg. A modification of the Nordberg process that will provide a titanium doped fused silica coating is as follows. Dry oxygen is bubbled through a tank containing a liquid mixture of approximately 53% by weight silicon-tetrachloride, $SiCl_4$, and 47% by weight titanium-tetrachloride, $TiCl_4$, which mixture is at a temperature of approximately 35°C. $SiCl_4$ and $TiCl_4$ vapors picked up by the oxygen are then passed through a gas-oxygen flame where they are hydrolyzed to form a soot, that is, minute glass particles, with a composition of approximately 95% by weight $SiO_2$ and 5% by weight $TiO_2$. The glass soot leaves the flame in a steady stream, and is deposited on at least a portion of one flat surface of a flat substrate. The thickness of the resulting coating is determined by the amount of soot deposited which is primarily controlled by the flow rate, the time allowed for deposition, and the velociites at which the substrate is translated. The soot so applied is either sintered as applied or is sintered by a subsequent operation to provide a dense, uniform coating.

The second coating of glass is thereafter applied over the exposed surface of the first coating. The glass of the second coating must have suitable physical and optical properties, such as coefficient of expansion, and index of refraction. A particularly effective means of forming the second coating is to sinter a soot layer of the desired material applied by the modified flame hydrolysis process heretofore described. Since the index of refraction of the cladding and consequently the second coating of glass must be lower than that of the core or first coating, the glass of the second coating may be of the same base material as the glass of the first coating except that it be undoped, or doped to a lesser degree than that of the first coating. If the second coating is applied by the modified flame hydrolysis process heretofore described, the process parameters would be substantially the same, except that the starting liquid mixture would either not contain titanium-tetrachloride so that the resulting coating would be pure $SiO_2$ or would contain a lesser amount of titanium-tetrachloride so that the resulting coating would be $SiO_2$ doped to a lesser degree than the first coating.

The necessary characteristics of a planar optical waveguide to transmit a useable quantity of light is dependent upon light energy not being lost through radiation due to light scattering centers, as well as not being excessively absorbed by the transmission material. These centers are often caused by tiny air bubbles or impurities in a waveguide at the core-cladding bond. The method of this invention combines an unusually clean and strong bond, thus eliminating most of the light scattering centers. Further, the method of the present invention provides a high purity film and permits ease of composition variation. In addition, the present method permits coating uniformity over a large surface and permits the control of OH which is inherently present in glass.

In a planar optical waveguide embodying three different media, various waveguide parameters must be corrdinated in accordance with the following equations to limit light propagation along the waveguide to preselected modes, whether single mode or multimode operation is desired. The three different waveguide media are the substrate, core, and cladding. As heretofore noted, for effective waveguide operation, the index of refraction of the core $n_2$ must be greater than the index of refraction of either the substrate or the cladding ($n_1$, $n_3$).

For $TM_{0m}$ modes where $m$ is an even integer
$$\beta a - \pi(m+1) = \tan^{-1}\alpha/\beta(n_2/n_1)^2 + \tan^{-1}\gamma/\beta(n_2/n_3)^2 \quad (1)$$

for $TM_{0m}$ modes where $m$ is an odd integer
$$\beta a - \pi(m+1) = -\cot^{-1}\alpha/\beta(n_2/n_1)^2 - \cot^{-1}\gamma/\beta(n_2/n_3)^2 \quad (2)$$

for $TE_{0m}$ modes where $m$ is an even integer
$$\beta a - \pi(m+1) = \tan^{-1}\alpha/\beta + \tan^{-1}\gamma/\beta, \text{ and} \quad (3)$$

for $TE_{0m}$ modes where $m$ is an odd integer
$$\beta a - \pi(m+1) = -\cot^{-1}\alpha/\beta - \cot^{-1}\gamma/\beta, \quad (4)$$

where
$$\beta^2 = K_2^2 - h^2 \quad (5)$$

$$\alpha^2 = h^2 - K_1^2 \quad (6)$$

$$\gamma^2 = h^2 - K_3^2 \quad (7)$$

and where
$$K_1 = 2\pi n_1/\lambda \quad (8)$$

$$K_2 = 2\pi n_2/\lambda \quad (9)$$

$$K_3 = 2\pi n_3/\lambda \quad (10)$$

These equations are applicable where the propagation constant h of the planar optical waveguide is equal to or less than the larger of $K_1$ and $K_3$ and where the core width is infinite. For the purposes of simplicity, the subscripts 1 and 3 apply to the parameters of either the substrate or the cladding layer. Assuming that $K_1$ is greater than $K_3$, then $K_1$ will define the cutoff propagation constant h for the m th mode. Substituting this into equations (1), (2), (3), and (4) will define the cut-off equations as follows.

For $TM_{0m}$ modes where m is an even integer
$$2a/\lambda \ (n_2{}^2 - n_1{}^2)^{1/2} = m+1 + 1/\pi \tan^{-1} (n_1{}^2 - n_3{}^2/n_2{}^2 - n_1{}^2)^{1/2} (n_2/n_3)^2, \quad (11)$$

for $TM_{0m}$ modes where m is an odd integer
$$2a/\lambda \ (n_2{}^2 - n_1{}^2)^{1/2} = m+1 - 1/\pi \cot^{-1} (n_1{}^2 - n_3{}^2/n_2{}^2 - n_1{}^2)^{1/2} (n_2/n_3)^2, \quad (12)$$

for $TE_{0m}$ modes where m is an even integer
$$2a/\lambda \ (n_2{}^2 - n_1{}^2)^{1/2} = m+1 + 1/\pi \tan^{-1} (n_1{}^2 - n_3{}^2/n_2{}^2 - n_1{}^2)^{1/2}, \text{ and} \quad (13)$$

for $TE_{0m}$ modes where m is an odd integer
$$2a/\lambda \ (n_2{}^2 - n_1{}^2)^{1/2} = m+1 - 1/\pi \cot^{-1} (n_1{}^2 - n_3{}^2/n_2{}^2 - n_1{}^2)^{1/2}, \quad (14)$$

where $m \leq 10$ and is the highest mode order to be propagated within a waveguide the first coating or core of which has a thickness a and an infinite width, $\lambda$ is the wavelength of light to be propagated within the waveguide the first coating of which has a thickness a and an infinite width, $n_2$ is the index of refraction of the core or first coating, and one of $n_1$ and $n_3$ being the index of refraction of said substrate while the other of $n_1$ and $n_3$ being the index of refraction of the second coating of glass.

It has been found that by the method of the present invention, a suitable planar optical waveguide having a core of any desired finite width may be formed with the core thickness being equal to or less than that determined by equations (11), (12), (13), and (14) when solved for a core having an infinite width and m equaling any integer up to and including 10. Although equations (11), (12), (13), and (14) apply to planar waveguides having cores of infinite width, they are substantially accurate for planar waveguides having core width to thickness ratios down to about 10. Below a ratio of about 10, significant error may be introduced into the computations and a determination in accordance with, for example, the heretofore noted article by E. A. J. Marcatili should be undertaken to solve for the various parameters involved.

For the case where $n_1$ equals $n_3$ and the core is of infinite width, equations (11), (12), (13), and (14) can be reduced to the following equation which applies to both $TE_{0m}$ and $TM_{0m}$ modes.

$$2a/\lambda \ (n_2{}^2 - n_1{}^2)^{1/2} = m + 1 \quad (15)$$

A specific example of a planar optical waveguide produced by the method of the present invention is as follows. A pure fused silica substrate having a thickness of at least 20 $\mu$m is carefully polished and cleaned to provide an optionally flat surface. A liquid mixture containing about 26.1 percent by weight $TiCl_4$ and 73.9 percent by weight $SiCl_4$ is heated to 35°C. Dry oxygen is bubbled through the liquid mixture and $SiCl_4$ and $TiCl_4$ vapors are picked up by th oxygen. This vapor containing oxygen is then passed through a gas-oxygen flame where the vapors hydrolyze to form a steady stream of approximately 0.1 $\mu$m sphere-like particles having a composition of approximately 2% by weight $TiO_2$ and 98% by weight $SiO_2$. The stream is directed towards the optically flat surface of the substrate and a soot layer of these particles is built up to a thickness of less than, but about 5.4 $\mu$m. Liquid $SiCl_4$ is then heated to about 35°C. and dry oxygen is bubbled through this liquid so that $SiCl_4$ vapors are picked up by the oxygen. This vapor containing oxygen is then passed through a gas-oxygen flame where the vapors hydrolyze to form a steady stream of 100% $SiO_2$ soot particles. The stream is directed to the exposed surface of the first coating and a soot layer of these particles is built up to a thickness of about 40 $\mu$m. This structure is then placed in an induction furnace having an oxygen atmosphere at about 1500°C. to sinter the first and second soot layers. Such sintering reduces the thickness of the layers by about one half. The resulting planar optical waveguide then has a core having a thickness of less than 2.7 $\mu$m and cladding on each side of about 20 $\mu$m. The index of refraction of the first coating or core will be approximately 1.4633. The index of refraction of the substrate and second coating will be approximately 1.4584. An index of refraction of 1.4584 for fused silica is generally accepted for sodium light having wavelength of 5893 A. The planar optical waveguide described in this example is capable of propagating only the single rectangular $TE_{01}$ and $TM_{01}$ mode combination.

The substrate on which the planar optical waveguide core of the present invention is formed has been described as substantially flat and no mention has been made of the waveguide length. As will be understood, the waveguide length is determined by each specific application and is not critical for the purposes of the present invention. As will also be understood, by the term substantially flat is meant that the substrate is flat for practical purposes for each finite length and width of the waveguide even though over its entire length and width it may have some curvature. Similarly the waveguide core and cladding has been illustrated as substantially straight, however, the core and cladding may have curvature thereto in both directions. If such curvature is excessive, however, it may cause light losses as will be understood in connection with any optical waveguide.

Although the present invention has been described with respect to specific details of certain embodiments thereof, it is not intended that such details be limitations upon the scope of the invention except insofar as set forth in the following claims.

We claim:

1. A planar optical waveguide for light propagation comprising
    a substantially flat glass substrate having a predetermined desired index of refraction,
    a first applied coating of glass having an index of refraction greater than that of said glass substrate deposited on and adhered to at least a portion of one flat surface of said substrate, said first coating of glass having an outer exposed surface substantially parallel to said one flat surface of said substrate, the thickness of said first coating being defined by said surfaces, the width of said first coating being the dimension perpendicular to both said thickness and the light propagation axis of said first coating, and a second applied coating of glass having an index of refraction less than that of said first coating of glass and effectively different than the index of refraction of said substrate, said second applied coating being deposited on at least said outer exposed surface of said first coating of glass and adhered thereto, the thickness of said first coating of glass for any desired finite width thereof being equal to or less than the thickness "$a$" of a coating having an infinite width, thickness "$a$" being determined in accordance with one of the following equations for $TM_{0m}$ modes where $m$ is an even integer $2a/\lambda \; (n_2^2 - n_1^2)^{1/2} = m + 1 + 1/\pi \tan^{-1} (n_1^2 - n_3^2/n_2^2 - n_1^2)^{1/2} (n_2/n_3)^2$, for $TM_{0m}$ modes where $m$ is an odd integer $2a/\lambda \; (n_2^2 - n_1^2)^{1/2} = m + 1 - 1/\pi \cot^{-1} (n_1^2 - n_3^2/n_2^2 - n_1^2)^{1/2} (n_2/n_3)^2$, for $TE_{0m}$ modes where $m$ is an even integer $2a/\lambda \; (n_2^2 - n_1^2)^{1/2} = m + 1 + 1/\pi \tan^{-1} (n_1^2 - n_3^2/n_2^2 - n_1^2)^{1/2}$, for $TE_{0m}$ modes where $m$ is an odd integer $2a/\lambda \; (n_2^2 - n_1^2)^{1/2} = m + 1 - 1/\pi \cot^{-1} (n_1^2 - n_3^2/n_2^2 - n_1^2)^{1/2}$, where $m \leq 10$ and is the highest mode order to be propagated within a waveguide the first coating of which has a thickness "$a$" and an infinite width, $\lambda$ is the wavelength of light to be propagated within said waveguide the first coating of which has a thickness "$a$" and an infinite width, $n_2$ is the index of refraction of said first coating, and one of $n_1$ and $n_3$ being the index of refraction of said substrate while the other of $n_1$ and $n_3$ being the index of refraction of said second coating of glass, said thickness of said first coating of glass being so determinable where the propagation constant of said waveguide is equal to or less than $K_1$, where $K_1$ is greater than $K_3$, where $K_1 = 2\pi n_1/\lambda$, and $K_3 = 2\pi n_3/\lambda$ the thickness of each of said substrate and said second coating of glass being at least about two times the thickness of said first coating of glass, whereas said first coating of glass forms the planar waveguide core, and said substrate and said second coating form the planar waveguide cladding.

2. The planar optical waveguide of claim 1 wherein said first and second applied coatings are sintered flame hydrolysis deposits.

3. The planar optical waveguide of claim 1 wherein said first coating is doped fused silica and said second coating is a material selected from the group consisting of pure fused silica and fused silica doped to a lesser degree than the material of said first coating.

4. The planar optical waveguide of claim 3 wherein said first coating is fused silica doped with at least one material selected from the group consisting of titanium oxide, tantalum oxide, tin oxide, niobium oxide, zirconium oxide, aluminum oxide, lanthanum oxide, and germanium oxide.

5. The planar optical waveguide of claim 3 wherein said first coating is fused silica doped with not more than 20 percent by weight titanium oxide.

6. The planar optical waveguide of claim 1 wherein the width to thickness ratio of said first coating is equal to or less than ten.

7. A planar optical waveguide for light propagation comprising a substantially flat glass substrate having a predetermined desired index of refraction.

a first applied coating of glass having an index of refraction greater than that of said glass substrate deposited on and adhered to at least a portion of one flat surface of said substrate, said first coating of glass having an outer exposed surface substantially parallel to said one flat surface of said substrate, the thickness of said first coating being defined by said surfaces, the width of said first coating being the dimension perpendicular to both said thickness and the light propagation axis of said first coating, and a second applied coating of glass having an index of refraction substantially equal to that of said substrate deposited on at least one said outer exposed surface of said first coating of glass and adhered thereto, the thickness of said first coating of glass for any desired finite width thereof being equal to or less than the thickness "$a$" of a coating having infinite width, thickness "$a$" being determined in accordance with the following equation $$2a/\lambda \; (n_2^2 - n_1^2)^{1/2} = m + 1$$

where $m \leq 10$ and is the highest mode order to be propagated within a waveguide the first coating of which has a thickness "$a$" and an infinite width, $\lambda$ is the cutoff wavelength of light to be propagated within said waveguide the first coating of which has a thickness "$a$" and an infinite width, $n_2$ is the index of refraction of said first coating, and $n_1$ is the index of refraction of said substrate and said substrate and said second coating of glass, said thickness of said first coating of glass being so determinable where the propagation constant of said waveguide is equal to or less than $K_1$, where $K_1 = 2\pi n_1/\lambda$, and the thickness of each of said substrate and said second coating of glass being at least about two times the thickness of said first coating of glass, whereas said first coating of glass forms the planar waveguide core, and said substrate and said second coating form the planar waveguide cladding.

8. The planar optical waveguide of claim 7 wherein said first and second applied coatings are sintered flame hydrolysis deposits.

9. The planar optical waveguide of claim 7 wherein said first coating is doped fused silica and said second coating is a material selected from the group consisting of pure fused silica and fused silica doped to a lesser degree than the material of said first coating.

10. The planar optical waveguide of claim 9 wherein said first coating is fused silica doped with at least one material selected from the group consisting of titanium oxide, tantalum oxide, tin oxide, niobium oxide, zirconium oxide, aluminum oxide, lanthanum oxide, and germanium oxide.

11. The planar optical waveguide of claim 9 wherein said first coating is fused silica doped with not more than 20 percent by weight titanium oxide.

12. The planar optical waveguide of claim 7 wherein the width to thickness ratio of said first coating is equal to or less than ten.

* * * * *